United States Patent
Koyanagi et al.

(10) Patent No.: US 6,183,044 B1
(45) Date of Patent: Feb. 6, 2001

(54) CHILD SEAT

(75) Inventors: Toshiro Koyanagi; Koji Hiramatsu; Tsuyoshi Fujiwara; Yoshinobu Sawamoto, all of Tokyo; Toshiaki Iwasaki, Aichi; Atsushi Hiroshige, Aichi; Shunichi Katsumata, Aichi, all of (JP)

(73) Assignees: Takata Corporation, Tokyo; Toyota Motor Corporation, Toyota, both of (JP)

( * ) Notice: Under 35 U.S.C. 154(b), the term of this patent shall be extended for 0 days.

(21) Appl. No.: 09/490,062

(22) Filed: Jan. 24, 2000

(30) Foreign Application Priority Data

Jan. 29, 1999 (JP) .................................. 11-022303
May 12, 1999 (JP) .................................. 11-131563

(51) Int. Cl.$^7$ ........................................ B60N 2/28
(52) U.S. Cl. ...................... 297/256.16; 297/253
(58) Field of Search ................. 297/130, 250.1, 297/253, 256.16

(56) References Cited

U.S. PATENT DOCUMENTS

| | | |
|---|---|---|
| 4,306,749 | * 12/1981 | Deloustal .................. 297/256.16 |
| 4,634,177 | 1/1987 | Meeker . |
| 4,943,113 | * 7/1990 | Meeker ...................... 297/256.16 |
| 5,385,387 | * 1/1995 | Kain ........................... 297/256.16 |
| 5,479,135 | 12/1995 | Kain . |
| 5,524,965 | * 6/1996 | Barley ........................ 297/256.16 |
| 5,941,601 | * 8/1999 | Scott et al. ....................... 297/253 |
| 5,971,479 | 10/1999 | Jacquemot et al. . |

FOREIGN PATENT DOCUMENTS 0 878 347    11/1998   (EP) .

* cited by examiner

Primary Examiner—Peter R. Brown
(74) Attorney, Agent, or Firm—Kanesaka & Takeuchi (57) ABSTRACT

A child seat is formed of a child seat main portion for holding a child having an engaging member, and a base on which the child seat main portion is detachably mounted. The base has a connecting portion to be connected to a vehicle, and a fixing member to be engageable with the engaging member of the child seat main portion. An engagement releasing member is installed in the base or the child seat main portion for releasing an engagement between the fixing member and the engaging member. Since the base can be connected to the vehicle without the child seat main portion, the child seat can be extremely simply fixed to the vehicle.

11 Claims, 6 Drawing Sheets

CHILD SEAT

BACKGROUND OF THE INVENTION AND RELATED ART STATEMENT

The present invention relates to a child seat to be installed on a seat in a vehicle.

The child seat is integrally formed of a seat portion on which buttocks of a child are put, and a back portion to which a back of the child leans.

A conventional child seat has been fixed to a seat in a vehicle by a webbing of a seat belt device for an adult. In case the child seat is fixed to the seat by the webbing as described above, the webbing has to be pulled out to fix the child seat and passed through or hooked on predetermined portions. Thus, fixing of the child seat has been troublesome. Also, since the child seat is bulky, it requires a great labor for carrying the child seat into a cabin of the vehicle.

European Patent Publication EP 841209A1 discloses that a receiving portion formed of rods provided on left and right sides of a seat in a car is provided, and a child seat is detachably mounted on the receiving portion. The child seat includes two vertical members extending rearwards, and forward ends of the vertical members are provided with engaging portions engaging the receiving portion. On the left and right sides of the child seat, arms are provided to rotate in the front and rear directions, and the arms are adapted to abut against a seat back of the seat in the car to thereby prevent the child seat from being floated.

In EP 841209A1, since the child seat is integrally formed as a whole, its bulk and weight are large, so that great labors are required for bringing the child seat in and out the car and fixing the child seat to the seat.

An object of the present invention is to provide a child seat which can be extremely simply fixed to a seat in a vehicle. Another object of the invention is to provide a child seat which can be easily carried.

SUMMARY OF THE INVENTION

A child seat of the present invention includes a child seat main portion having a seat portion on which buttocks of a child are put and a back portion to which a back of the child leans; and a base on which the child seat main portion is mounted. The base is provided with a connecting portion to be connected to the vehicle, and the child seat main portion is detachably mounted on the base. In order to fix the child seat main portion to the base, the base is provided with a fixing member for the child seat main portion, the child seat main portion is provided with an engaging member to engage the fixing member, and either the base or the child seat main portion is provided with an engagement releasing member for releasing the engagement.

In the child seat, after the base is fixed to the vehicle, the child seat main portion is mounted on the base. By forming the base and the child seat main portion separately as described above, each of the base and child seat main portion can be easily carried in or out of a cabin of the vehicle.

Also, in case only the base separated from the child seat main portion is mounted on a seat, since the base is not accompanied with the child seat main portion, the fixing operation of the base can be easily carried out.

The fixing member can be moved generally parallel to an upper surface of the base, and preferably includes a hook taking an engaging position where the hook engages the engaging member and an engagement releasing position away from the engaging position; and a spring for urging the hook toward the engaging position.

In this case, when the engaging member of a base main portion is put on the hook and pressed downwards, the hook is once retreated and the engaging member enters deeply, and then the hook is pressed by the spring to thereby advance, so that an engagement between the engaging member and the hook is completed. In order to release the engagement, it is preferable that the hook is movable in the front and rear directions of the base main portion; and the engagement releasing member is connected to the hook, and the forward end thereof faces a front surface of the base main portion. Through the movement of the operating piece in the front and rear directions, the engagement between the hook and the engaging member can be released.

In order to prevent the base from being floated, it is preferable to provide a float preventing or fitting member for preventing the base main portion from being floated from a seat cushion by abutting against a seat back in the vehicle. It is also preferable that the float preventing member is supported to be rotatable in the front and rear directions with respect to the base main portion, and includes an abutting member for abutting against the seat back and a one way coil for preventing the abutting member from being rotated forward.

In the present invention, in the condition that the child seat main portion is mounted on the base, it is possible to disable release of engagement of the child seat with the vehicle. For this purpose, an operating piece for releasing the engagement of the child seat with the vehicle is formed in the base, and a preventing member for preventing movement of the operating piece in a direction of releasing the engagement may be provided in the child seat main portion. On the contrary, the preventing member may be formed on the base, and the operating piece may be formed in the child seat main portion.

DETAILED DESCRIPTION OF PREFERRED EMBODIMENTS

Figure 6:
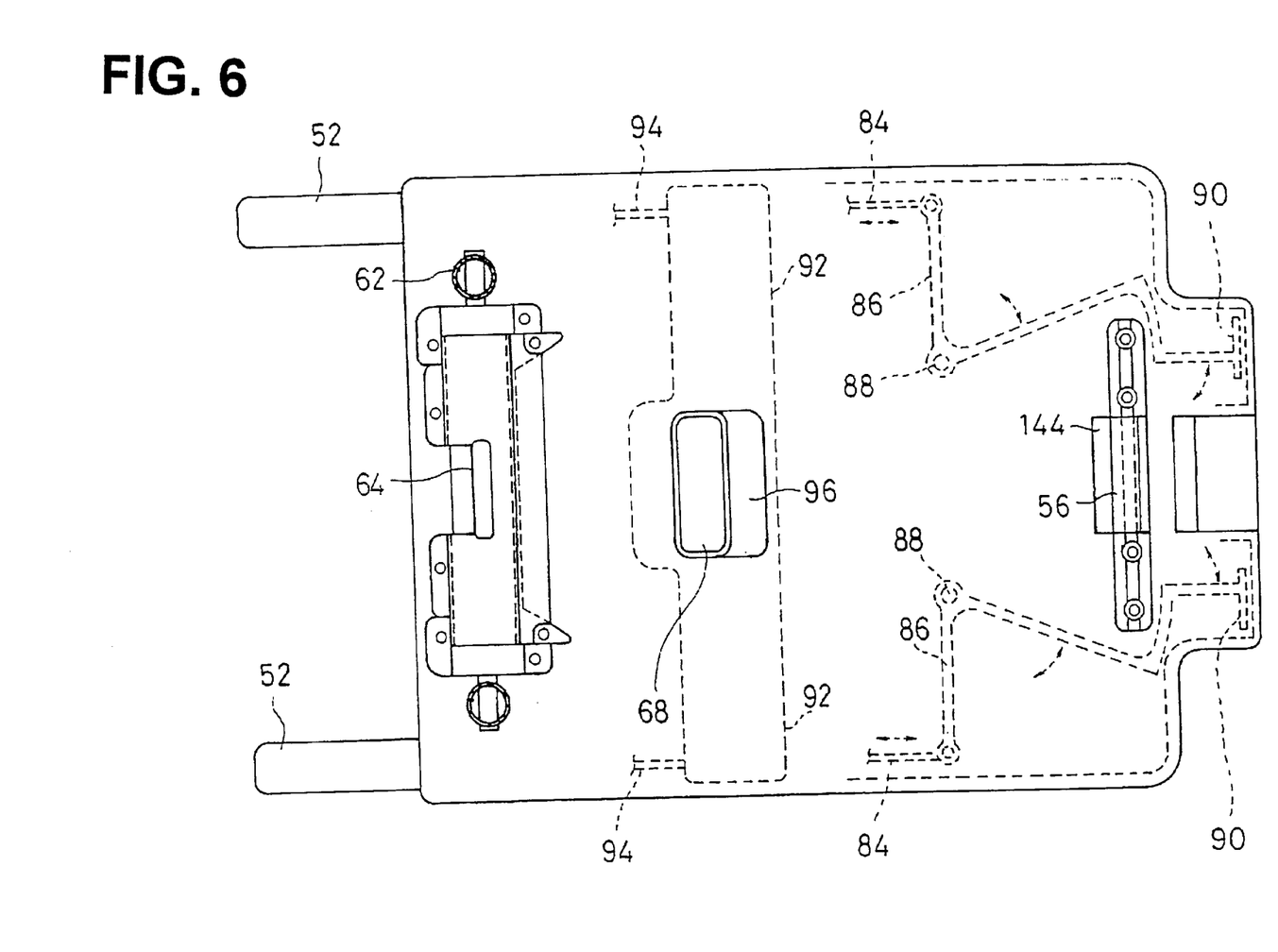
FIG. 6 is a plan view of a base.
Figure 7:
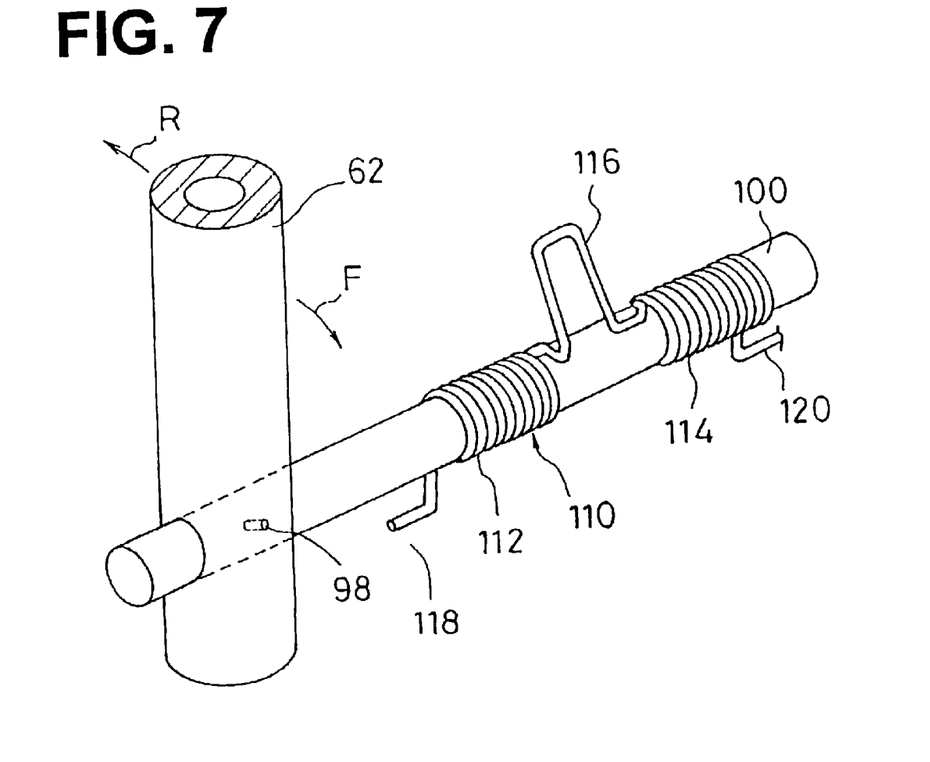
FIG. 7 is a perspective view for showing a shaft and a one way coil.
Figure 8:
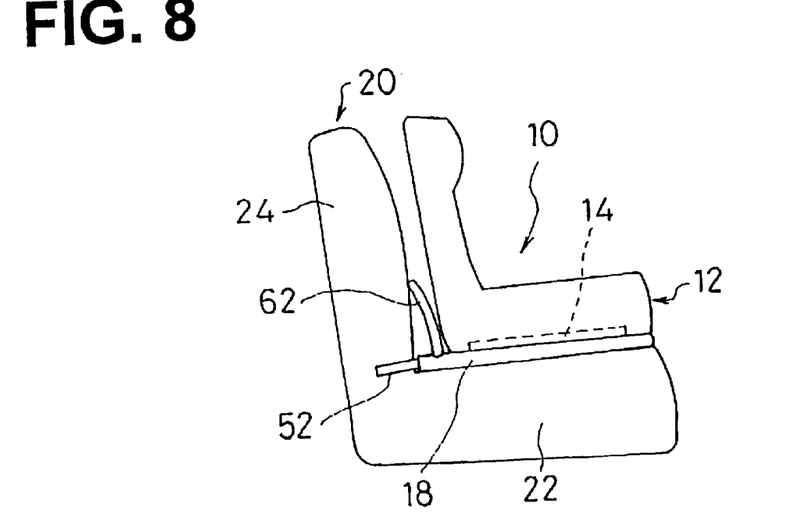
FIG. 8 is a sectional view in a state where the child seat of the embodiment is attached.

Hereunder, with reference to FIGS. 1 through 8, embodiments of a child seat are explained. The child seat 10, as shown in FIG. 8, is installed on a seat 20, in a vehicle, having a seat cushion 22 and a seat back 24. The child seat 10 includes a child seat main portion 12 and a base 18 to which the child seat main portion is detachably fixed. To the child seat main portion 12, a connecting bottom plate 14 is integrally provided. The base 18 is mounted on the seat cushion 22 of the seat 20 in the vehicle and fixed thereto.

Figure 1:
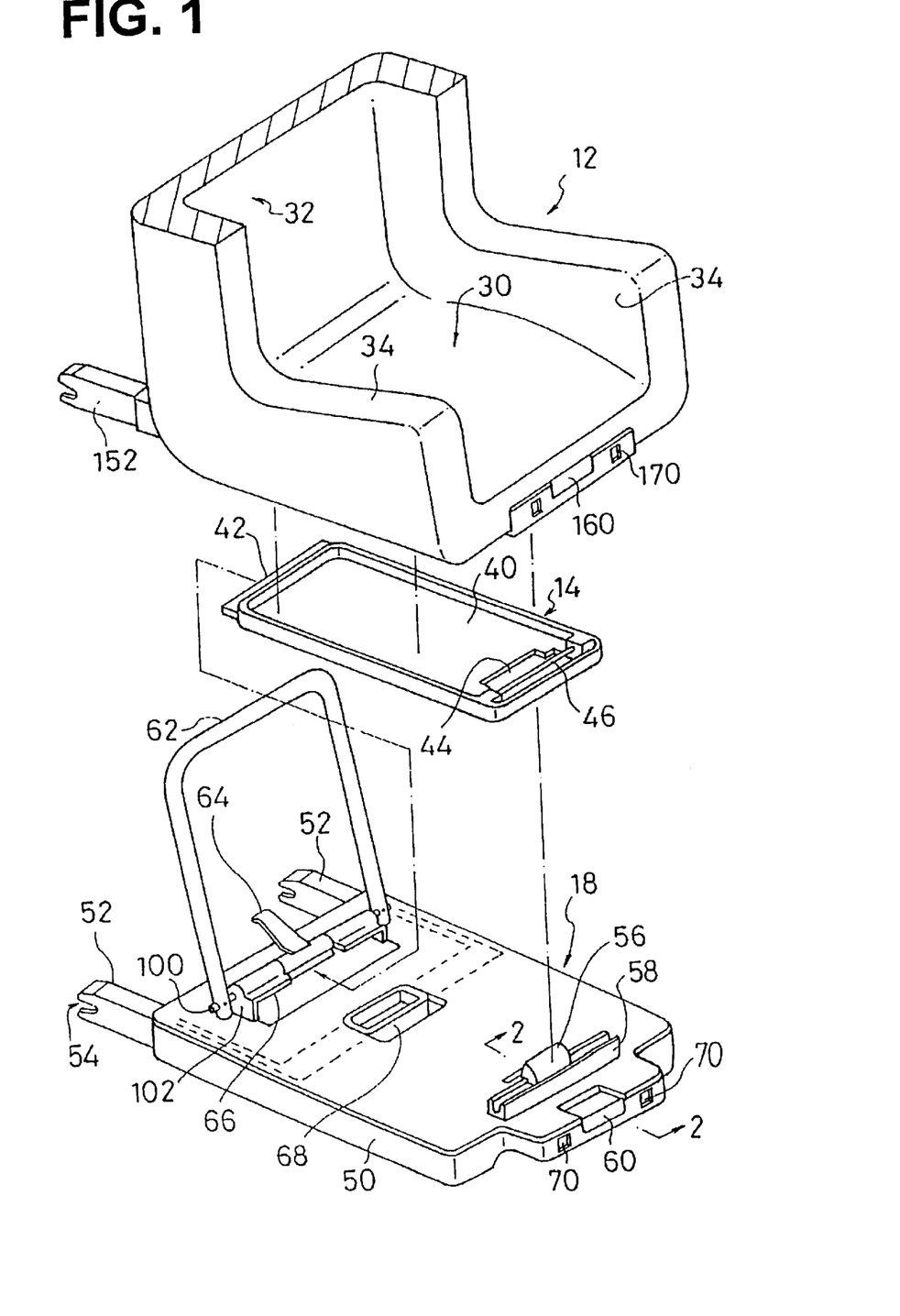
FIG. 1 is an exploded perspective view of a child seat according to the present embodiment.

The child seat main portion 12, as shown in FIG. 1, includes a seat portion 30, a back portion 32, arm portions 34, and is integrally formed by a synthetic resin, for example urethane or the like. It is preferable that the bottom plate 14 is integrally fixed to a bottom surface of the child seat main portion 12 through an insert molding, bolting, riveting or the like.

The bottom plate 14 includes a main plate portion 40 in a rectangular shape; a flange 42 extending from a rear side of the main plate portion 40; an opening 44 provided in a front portion of the main plate portion 40; and a bar 46 parallel to a front side of the main plate portion 40 so that the bar crosses the opening 44.

The base 18 is formed of a base main portion 50 in a shape of a rectangular board; a pair of arms 52 extending rearwards from both edges of a rear portion of the base main portion 50; holding portions 54 provided to forward edges of the arms 52; a hook 56 disposed in a front portion of the base main portion 50; a bar engaging member 58; an operating piece 60 for releasing an engagement of the hook 56; a float stopper 62, as a float preventing or fitting member, provided on an upper surface of the rear portion of the base main portion 50; a lever 64 for releasing the float stopper 62; a flange pressing member 66 engaging the flange 42; an operating piece 68 for unclamping the holding portions 54; and windows 70 for displaying a holding state by the holding portions 54; and the like.

Figure 4:
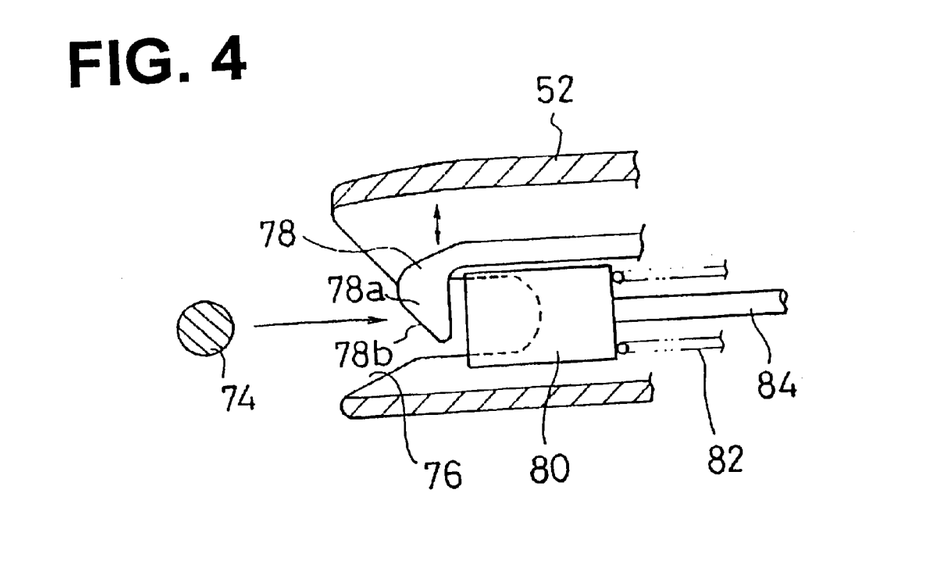
FIG. 4 is a vertical sectional view of a forward end portion of an arm.
Figure 5:
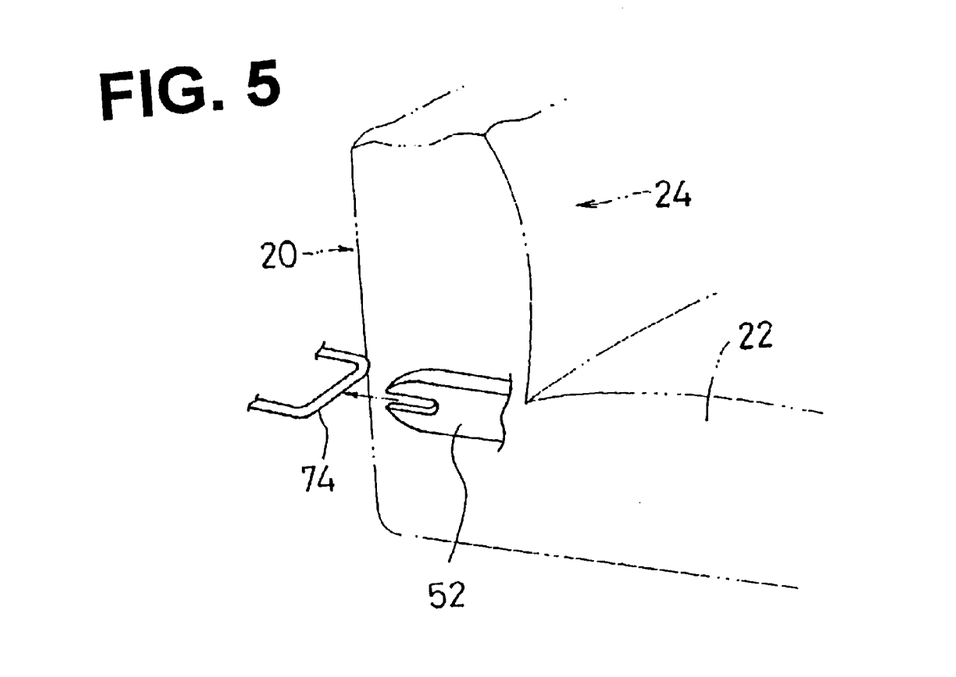
FIG. 5 is a perspective view for showing an engaging relationship between the arm and a clamping bar.

The holding portions 54 of the arms 52, as shown in FIGS. 4 and 5, hold clamping bars 74 provided on both left and right sides of the rear portion of the seat 20 in the vehicle. The bars 74 extend in a widthwise direction of the vehicle. On a rear edge side of each arm 52, a depressed portion 76 for receiving therein the bar 74 and a hook 78 for latching the clamping bar 74 entered into the depressed portion 76 are provided.

Each hook 78 is vertically rotatable by a shaft (not shown) and, at the same time, urged in a direction (a lower direction in FIG. 4) such that a claw portion 78a engages the bar 74 by a spring (not shown). In case the bar 74 enters the depressed portion 76, the bar 74 hits an inclined surface 78b of the hook 78. Then, the bar 74 pushes up the claw portion 78a of the hook 78 to enter the depressed portion 76 further. When the bar 74 enters further beyond the claw portion 78a, the claw portion 78a is pressed down by the spring (not shown), so that the bar 74 is held in a latched state.

Incidentally, when the bar 74 enters further than the claw portion 78a, the bar 74 hits a block 80 to push the same forward (right side in FIG. 4) and move. The block 80 is normally urged rearwards (left side in FIG. 4) by a spring 82. Also, one end of a tie rod 84 is connected to the block 80, and the other end thereof is connected to a rear end of a link 86 (FIG. 6).

The link 86 is rotatable around a supporting shaft 88. At a forward end of the link 86, a colored plate 90 facing the window hole 70 is provided. The colored plate 90 is colored by two colors, for example, red on the left half side and green on the right half side thereof.

In case the block 80 is not pushed inward by the clamping bar 74, the red surface faces the window hole 70 and the red color can be seen from the outside of the base 18. In case the clamping bar 74 enters the depressed portion 76 to be held in a clamped state by the hook 78, the block 80 is pushed inward by the bar 74, so that the tie rod 84 is moved in the right side in FIGS. 4 and 6, and the link 86 is rotated around the supporting shaft 88 to thereby cause only the green surface of the colored plate 90 to face the window hole 70.

Accordingly, in case only the green color is seen from the window hole 70, it can be visually acknowledged that the clamping bar 74 is latched by the hook 78.

In order to release the latched state of the bars 74 by the hooks 78, the operating piece 68 and the hooks 78 are connected through an advance or retreat plate 92 and hook operating rods 94.

The operating piece 68 can be moved in the front and rear directions of the base 18 within an opening 96 on an upper surface of the base 18. The advance or retreat plate 92 integrated with the operating piece 68 extends in the left and right directions, and forward ends of the hook operating rods 94 are connected to the advance or retreat plate 92. The rear ends of the hook operating rods 94 are connected to the respective ends of the hooks 78, and in case the rods 94 are moved to a right side in FIG. 6, the claw portions 78a of the hooks 78 are lifted to thereby release the engagements between the claw portions 78a and the clamping bars 74.

In case the right and left arms 52 are connected to the clamping bars 74, respectively, although the base 18 can not be moved in the front and rear directions and in the left and right directions of the car, a forward edge side of the base 18 can be lifted or floated in a vertical direction. As a float preventing or fitting member for preventing the forward edge side of the base 18 from being floated, the float stopper 62 is provided.

The float stopper 62, as shown in FIG. 1, is formed of a pipe in an inversed U-shape. As shown in FIG. 7, lower ends of the float stopper 62 are connected to a shaft 100 through pins 98 to be integrally connected therewith. The shaft 100 extends in the left and right directions of the base 18 and is rotatably supported by left and right wall portions 102 (refer to FIG. 1) of the flange pressing member 66.

A one way coil 110 is closely attached to the shaft 100. The one way coil 110 is formed of a left half portion 112 and a right half portion 114 in series, and an extended portion 116 extending in a loop shape in a radial direction is provided between the left half portion 112 and the right half portion 114. By mounting a cover to the extended portion 116, the lever 64 is formed.

A left end 118 and a right end 120 of the one way coil 110 are connected to the left and right wall portions 102, respectively, so that both ends of the coil 110 can not rotate around the shaft 100. Since the coil 110 is closely attached to the shaft 100, in case the float stopper 62 is tried to rotate in an F direction or R direction in FIG. 7, the coil 110 is also going to rotate together with the shaft 100. When the float stopper 62 is rotated in the R direction, since a rotating force applied to the coil 110 acts in a direction such that the coil 110 is loosened, an outer circumferential surface of the shaft 100 slides on an inner circumferential surface of the coil 110. Thus, the float stopper 62 can rotate freely in the R direction (backward).

In case the float stopper 62 is tried to rotate in the F direction (forward), since the shaft 100 applies a rotating force to the coil 110 in a direction to tighten the coil 110, the coil 110 is extremely tightly fixed to the shaft 100 to thereby prevent the shaft 100 from rotating and also to prevent the float stopper 62 from rotating in the F direction.

When the lever 64 is pressed in the R direction, the extended portion 116 is rotated in the R direction, so that the coil 110 is loosened and the float stopper 62 can rotate in the F direction. Therefore, after the base 18 is mounted on the seat cushion 22 and the arms 52 of the base 18 are connected to the clamping bars 74, the float stopper 62 is pressed backward to be pressed against the seat back 24, so that the base 18 is fixed to the seat 20 to thereby not be moved in the front and rear directions, the left and right directions, and the vertical direction. When the lever 64 is pressed to rotate the float stopper 62 forward, and then, the operating piece 68 is pulled forward to pull up the claw portions 78a of the hooks 78, the base 18 can be removed from the seat 20.

In case the child seat main portion 12 is attached to the base fixed to the seat 20, after the flange 42 of the connecting bottom plate 14 is inserted into a lower side of the flange pressing member 66, a front side of the child seat main portion 12 is pressed downward to thereby cause the bar 46 to be connected to the base 18 by the bar engaging member 58 and the hook 56.

Figure 2:
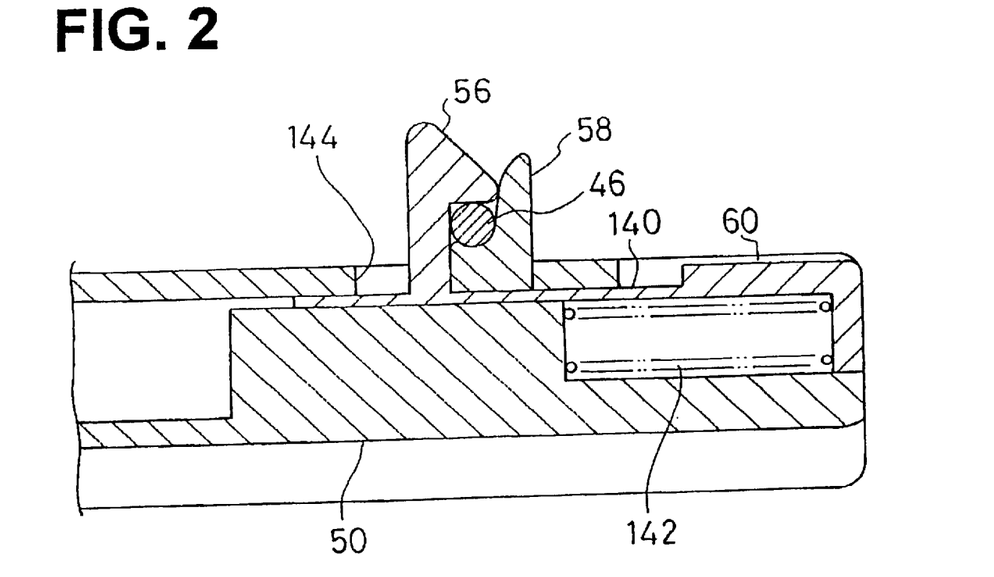
FIG. 2 is an enlarged sectional view taken along line 2—2 in FIG. 1.
Figure 3:
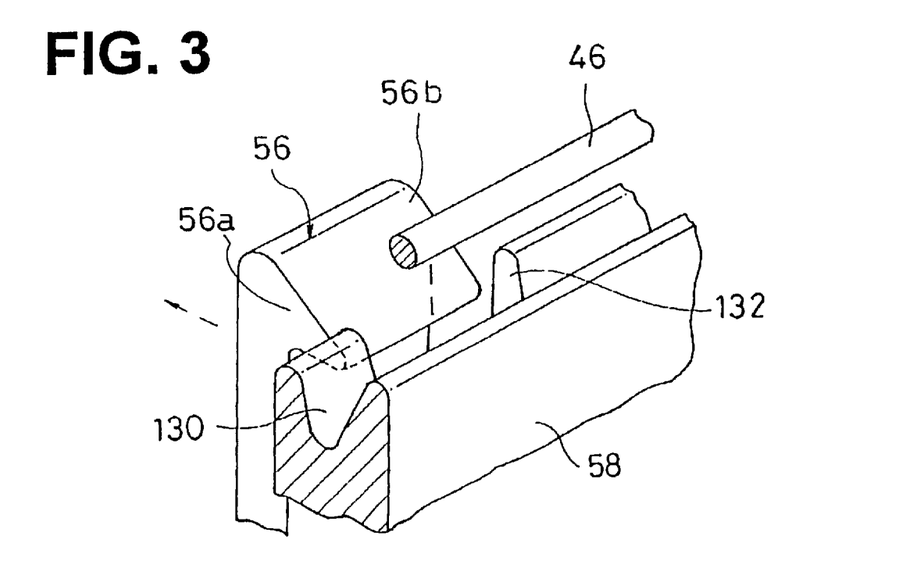
FIG. 3 is a partial perspective view of a hook and a bar engaging member.

The bar engaging member 58, as shown by enlarged drawings in FIGS. 2 and 3, is a rail shape member extending in the left and right directions of the base 18 and fixed to the base 18 by screws or the like. An upper surface of the bar engaging member 58 is provided with a groove 130 in a longitudinal direction to receive the bar 46 therein.

A recessed portion 132 for receiving therein the claw portion 56a of the hook 56 is provided to an intermediate portion in the longitudinal direction of the bar engaging member 58. The hook 56, as shown in FIG. 2, is integrally formed with a sliding plate 140, and the sliding plate 140 is integrated with the operating piece 60.

The operating piece 60 is urged forward by a spring 142. As shown in FIG. 3, the hook 56 stands upright through an opening 144 of an upper surface of the base 18. An upper surface of the claw portion 56a of the hook 56 becomes a downward slope 56b descending forward.

As shown in FIG. 3, when the bar 46 of the connecting bottom plate 14 is pressed from an upper side against the slope 56b, the hook 56 is retreated and the bar 46 enters the groove 130. When the bar 46 passes through the claw portion 56a, the hook 56 is advanced by a pressing force of the spring 142 and the claw portion 56a covers the bar 46 to thereby fix the connecting bottom plate 14 and the child seat main portion 12 integrally connected thereto to the base 18.

In order to release the engagement, the operating piece 60 is pushed to retreat the hook 56, and then, the child seat main portion 12 is pulled upward.

As described hereinabove, in the child seat, since the child seat main portion 12 and the base 18 are formed separately, the child seat main portion 12 and the base 18 can be brought into the vehicle separately and mounted therein separately. In case the fixing operation of the base 18 is carried out, since the child seat main portion 12 is separated therefrom, the connecting operation between the holding portions 54 of the arms 52 and the clamping bars 74 can be carried out easily.

In order to fix the base 18, after the arms 52 and the clamping bars 74 are engaged with each other, the float stopper 62 may only be pushed rearward. Thus, fixing of the base 18 is carried out extremely simply and fixing strength of the base 18 is also extremely high. In case the child seat main portion 12 is fixed to the base 18, the flange 42 is inserted into the under side of the flange pressing member 66 and then the front side of the child seat main portion 12 is pressed downward. Thus, the fixing can be done simply. Moreover, the connection between the child seat main portion 12 and the base 18 is extremely strong.

Incidentally, in the present embodiment, the rear surface of the child seat main portion 12 is provided with arms 152 similar to the arms 52, so that the child seat main portion 12 can be directly attached to the seat 20 without the base 18. One wide arm similar to the arm 52 may be used.

In the present embodiment, the bar 46 is provided to the connecting bottom plate 14 constituting a part of the child seat main portion 12, and the hook 56 and the operating piece 60 are disposed on the base 18, but the bar 46 may be provided to the base 18, and the hook 56 and operating piece 60 may be located to the child seat main portion 12 (for example, connecting bottom plate 14).

Figure 9:
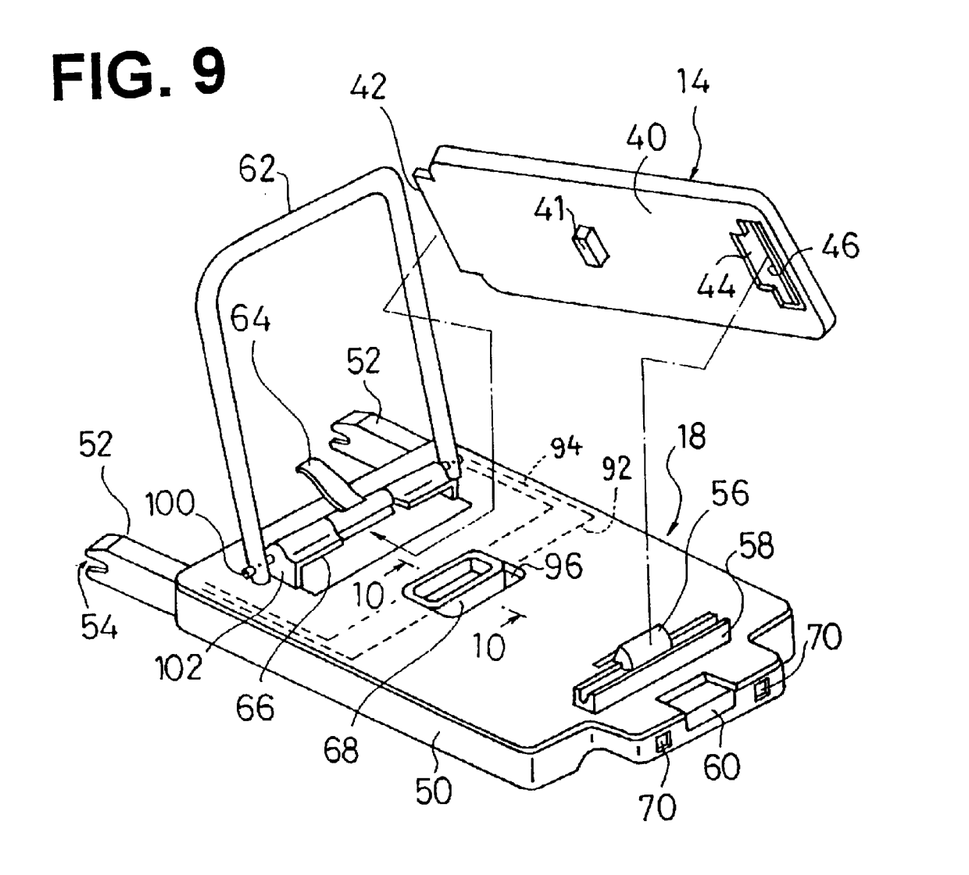
FIG. 9 is an exploded perspective view for showing a part of another embodiment of a child seat of the invention.
Figure 10:
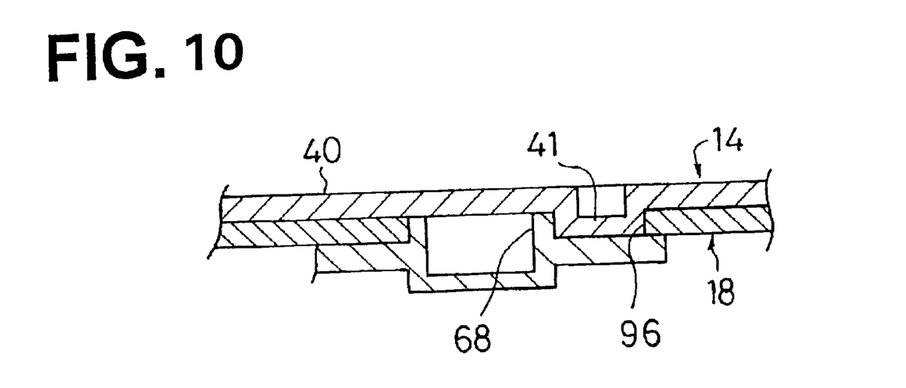
FIG. 10 is an enlarged sectional view taken along line 10—10 in FIG. 9.

In the present invention, in the condition that the child seat main portion 12 is mounted on the base 18, it is possible to disable release of engagement of the child seat 10 with the vehicle. FIGS. 9 and 10 show an embodiment structured as stated above, wherein a projecting portion 41 as an operating piece move-preventing member projects from the bottom surface of the bottom plate 14 of the child seat main portion 12. When the child seat main portion 12 is mounted on the base 18, the projecting portion 41 enters into the opening 96. Namely, the projecting portion 41 is located between the operating piece 68 and the front end of the opening 96, as shown in FIG. 10. As a result, the forward movement of the operating piece 68 is blocked to prevent the retracting movement of the claw portion 78a of the hook 78. Thus, the release of the engagements of the hooks 78 with the clamping bars 74 is disabled.

As described hereinabove, in the child seat of the present invention, since the child seat main portion and the base are separately formed, it is easy to bring them into the vehicle, separately.

In case the fixing operation of the base is carried out, since the child seat main body is separated therefrom, the operation can be done easily.

The base can be prevented from being floated by the float preventing member. Thus, the operation for fixing the child seat main portion to the base can also be extremely easily carried out.

While the invention has been explained with reference to the specific embodiments of the invention, the explanation is illustrative and the invention is limited only by the appended claims.

What is claimed is:

1. A child seat comprising,
  a child seat main portion for holding a child having an engaging member,
  a base on which said child seat main portion is detachably mounted, said base having an upper portion, a connecting portion at one side of the base adapted to be connected to a bar of a vehicle, and a fixing member formed at the upper portion to be engageable with the engaging member of the child seat main portion,
  an engagement releasing member installed in one of the base and the child seat main portion for releasing an engagement between the fixing member and the engaging member, and
  a fitting member formed at a rear area of the base for fitting the base tightly onto a seat of the vehicle, said fitting member being attached to the base to rotate in front and rear directions of the base and having an abutting member to abut against a seat back and a spring for preventing the abutting member from being rotated forward.

2. A child seat as claimed in claim 1, wherein said fixing member is movable substantially parallel to an upper surface of the base, and includes a hook having an engaging position where the hook engages the engaging member and an engagement releasing position where the hook is separated from the engaging position, and a spring for urging the hook toward the engaging position.

3. A child seat as claimed in claim 2, wherein said hook is movable in front and rear directions of the base, and said engagement releasing member is connected to the hook and has a forward end located at a front surface of the base.

4. A child seat as claimed in claim 1, wherein said fitting member further includes a shaft rotatably attached to the base and immovably fixed to the abutting member, and a lever, said spring being one way coil wound on the shaft and the lever being attached to the one way coil to release an engagement of the one way coil to the shaft.

5. A child seat as claimed in claim 1, wherein said base further includes an operating member connected to the connecting portion for releasing engagement of the connecting portion with the vehicle.

6. A child seat as claimed in claim 5, wherein said child seat main portion further includes a move-preventing member engaging the operating member when the child seat main portion is mounted on the base, to thereby prevent the operating member from moving in a direction of releasing the engagement of the connecting portion.

7. A child seat as claimed in claim 5, wherein said connecting portion includes at least one arm extending from the base and having a hook adapted to engage the bar attached to the vehicle, said hook being connected to the operating member for disengaging the hook from the bar, and a display member associated with the arm and extending to a front portion of the base so that when the display member is pushed by an engagement of the hook with the bar, the display section displays an engagement condition.

8. A child seat as claimed in claim 1, wherein said child seat main portion includes a seat portion for allowing a child to sit thereon, a back portion for supporting a back of the child, and a connecting plate attached to a bottom of the main portion and having said engaging member.

9. A child seat as claimed in claim 8, wherein said engaging member includes a bar and a flange located away from the bar, and said fixing member includes a flange pressing member engaging the flange and a hook located away from the flange pressing member and engaging the bar.

10. A child seat as claimed in claim 1, wherein said engaging member is formed of a bar and a flange located away from each other, and said fixing member is formed of a flange pressing member engaging the flange and a hook located away from the flange pressing member and engaging the bar.

11. A child seat as claimed in claim 10, wherein said engaging releasing member is connected to the hook for moving the hook to disengage from the bar.

\* \* \* \* \*